(12) United States Patent
Park

(10) Patent No.: US 9,186,996 B2
(45) Date of Patent: Nov. 17, 2015

(54) REGENERATIVE BRAKE APPARATUS OF HYBRID VEHICLE AND METHOD THEREOF

(71) Applicant: Hyundai Motor Company, Seoul (KR)

(72) Inventor: Jae Beom Park, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/338,098

(22) Filed: Jul. 22, 2014

(65) Prior Publication Data

US 2015/0183324 A1    Jul. 2, 2015

(30) Foreign Application Priority Data

Dec. 26, 2013 (KR) .................. 10-2013-0163789

(51) Int. Cl.
| | | |
|---|---|---|
| *B60W 10/04* | (2006.01) | |
| *B60L 7/18* | (2006.01) | |
| *B60W 20/00* | (2006.01) | |
| *B60K 6/442* | (2007.10) | |
| *B60W 10/08* | (2006.01) | |

(52) U.S. Cl.
CPC . *B60L 7/18* (2013.01); *B60K 6/442* (2013.01); *B60W 10/08* (2013.01); *B60W 20/00* (2013.01); *B60W 20/1062* (2013.01); *Y10S 903/947* (2013.01)

(58) Field of Classification Search
None
See application file for complete search history.

(56) References Cited

U.S. PATENT DOCUMENTS

| | | | | |
|---|---|---|---|---|
| 6,445,982 | B1 * | 9/2002 | Swales | B60K 6/485 307/10.6 |
| 8,066,339 | B2 * | 11/2011 | Crombez | B60L 7/18 303/152 |
| 8,527,145 | B2 * | 9/2013 | Yu | B60K 35/00 701/22 |
| 8,577,582 | B2 * | 11/2013 | Yu | F02D 28/00 123/179.4 |
| 8,688,302 | B2 * | 4/2014 | Sujan | B60W 10/08 180/65.27 |
| 9,026,285 | B2 * | 5/2015 | Shin | B60W 20/106 180/65.265 |
| 2002/0138182 | A1 | 9/2002 | Swales et al. | |
| 2004/0204277 | A1 * | 10/2004 | Duan | B60K 6/26 475/5 |
| 2006/0022519 | A1 * | 2/2006 | Ji | B60K 6/48 303/152 |
| 2006/0186738 | A1 * | 8/2006 | Noguchi | B60K 6/28 307/10.1 |

(Continued)

FOREIGN PATENT DOCUMENTS

| | | |
|---|---|---|
| JP | 2003-293819 A | 10/2003 |
| JP | 2013-198373 A | 9/2013 |

(Continued)

*Primary Examiner* — Jonathan M Dager
(74) *Attorney, Agent, or Firm* — Morgan, Lewis & Bockius LLP

(57) ABSTRACT

A regenerative braking apparatus of a hybrid vehicle may include an engine generating power by combustion of fuel, an HSG starting the engine and generating electrical energy by operating as a generator when the engine is in an on state, a motor assisting the power of the engine, being operated as a generator and generating electrical energy in braking, and a controller controlling such that a hybrid vehicle is braked by regenerative braking according to an operation of the HSG when deceleration energy in braking is higher than a generating capacity of the motor.

8 Claims, 3 Drawing Sheets

(56) References Cited

U.S. PATENT DOCUMENTS

| | | | | |
|---|---|---|---|---|
| 2009/0096285 A1* | 4/2009 | Acena | B60L 11/005 | 307/10.1 |
| 2010/0076634 A1* | 3/2010 | Brigham | B60K 6/485 | 701/22 |
| 2010/0244547 A1* | 9/2010 | Gilles | B60L 7/26 | 303/3 |
| 2011/0005850 A1* | 1/2011 | Colvin | B60K 6/485 | 180/65.28 |
| 2012/0244979 A1* | 9/2012 | Kruger | B60K 6/383 | 475/5 |
| 2012/0265382 A1* | 10/2012 | Nefcy | B60W 10/06 | 701/22 |
| 2013/0066499 A1* | 3/2013 | Niste | B60K 6/28 | 701/22 |
| 2013/0110333 A1* | 5/2013 | Song | B60K 6/387 | 701/22 |
| 2013/0116889 A1* | 5/2013 | Zhang | B60L 7/12 | 701/36 |
| 2013/0138280 A1* | 5/2013 | Kim | B60W 10/30 | 701/22 |
| 2013/0151044 A1* | 6/2013 | Lee | B60W 10/06 | 701/22 |
| 2013/0154576 A1* | 6/2013 | Shin | B60W 20/106 | 320/162 |
| 2014/0045648 A1* | 2/2014 | Bangura | F02N 11/006 | 477/3 |
| 2014/0100729 A1* | 4/2014 | Jung | F02D 41/042 | 701/22 |
| 2014/0100730 A1* | 4/2014 | Park | B60W 10/06 | 701/22 |
| 2014/0148983 A1* | 5/2014 | Kim | B60W 20/1062 | 701/22 |
| 2014/0155222 A1* | 6/2014 | Kim | B60W 20/106 | 477/5 |
| 2015/0054337 A1* | 2/2015 | Ogale | B60L 11/18 | 307/10.1 |
| 2015/0102753 A1* | 4/2015 | Yoo | H02P 21/0096 | 318/400.02 |
| 2015/0105215 A1* | 4/2015 | Park | B60K 6/442 | 477/5 |

FOREIGN PATENT DOCUMENTS

| | | |
|---|---|---|
| KR | 10-2011-0062135 A | 6/2011 |
| KR | 10-1339264 B1 | 12/2013 |

\* cited by examiner

REGENERATIVE BRAKE APPARATUS OF HYBRID VEHICLE AND METHOD THEREOF

CROSS-REFERENCE TO RELATED APPLICATION

This application claims priority to Korean Patent Application No. 10-2013-0163789 filed Dec. 26, 2013, the entire contents of which is incorporated herein for all purposes by this reference.

BACKGROUND OF THE INVENTION

1. Field of the Invention

The present invention relates to a regenerative braking apparatus of a hybrid vehicle and a method thereof. More particularly, the present invention relates to a regenerative braking apparatus of a hybrid vehicle and a method in which a hybrid starter generator (HSG) is braked by regenerative braking when deceleration energy exceeding a capacity of a motor is generated.

2. Description of Related Art

A hybrid vehicle is a vehicle using two or more power sources, for example, an internal combustion engine and a motor.

The hybrid vehicle can be manufactured in various types by using two or more power sources including the engine and the motor. The motor provided in the hybrid vehicle assists the engine under acceleration or uphill driving.

The motor operates as a generator in braking of the vehicle, and generates a braking force by transforming kinetic energy generated in braking to electrical energy. The transformed electrical energy is charged to a battery.

As described above, a system that transforms the kinetic energy generated in braking to electrical energy and recovers the energy is called a regenerative braking system.

In a general regenerative braking system applied to the hybrid vehicle, when deceleration energy generated during deceleration of the vehicle exceeds generating capacity of the motor, the excess deceleration energy cannot be regenerative.

Accordingly, a method that regenerates the excess deceleration energy and reduces fuel consumption of the vehicle is required.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a regenerative braking apparatus of a hybrid vehicle, and a method that regenerates deceleration energy generated in deceleration of the hybrid vehicle and improves fuel consumption of the vehicle.

In an aspect of the present invention, a regenerative braking apparatus of a hybrid vehicle may include an engine generating power by combustion of fuel, a Hybrid Starter Generator (HSG) starting the engine and generating electrical energy by operating as a generator when the engine is in an on state, a motor assisting the power of the engine, being operated as a generator, and generating electrical energy in braking, and a controller controlling such that the hybrid vehicle is braked by regenerative braking according to an operation of the HSG when deceleration energy in braking is higher than a generating capacity of the motor.

The controller compares an additional torque with a friction torque of the engine, the additional torque being determined by subtracting a maximum torque of the motor from a required torque in braking, regeneratively brakes the motor and the HSG when the additional torque is higher than the friction torque, and regeneratively brakes the motor when the additional torque is lower than the friction torque.

The controller maximizes an opening of a vein of a turbocharger supplying high pressure air to a combustion chamber of the engine in the regenerative braking of the HSG.

The controller changes shift speed to minimize the friction torque of the engine in the regenerative braking of the HSG.

In another aspect of the present invention, a regenerative braking method of a hybrid vehicle may include determining a friction torque of an engine and an additional torque, the additional torque being determined by subtracting a maximum torque of a motor from a required torque in braking, determining whether the additional torque is higher than the friction torque of the engine, and braking the motor and the HSG by regenerative braking when the additional torque is higher than the friction torque of the engine.

The regenerative braking method of the hybrid vehicle may further include maximizing an opening of a vein of a turbocharger supplying high pressure air to a combustion chamber of the engine in regenerative braking of the engine.

The regenerative braking method of the hybrid vehicle may further include changing a shift-speed to minimize the friction torque of the engine in regenerative braking of the HSG.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
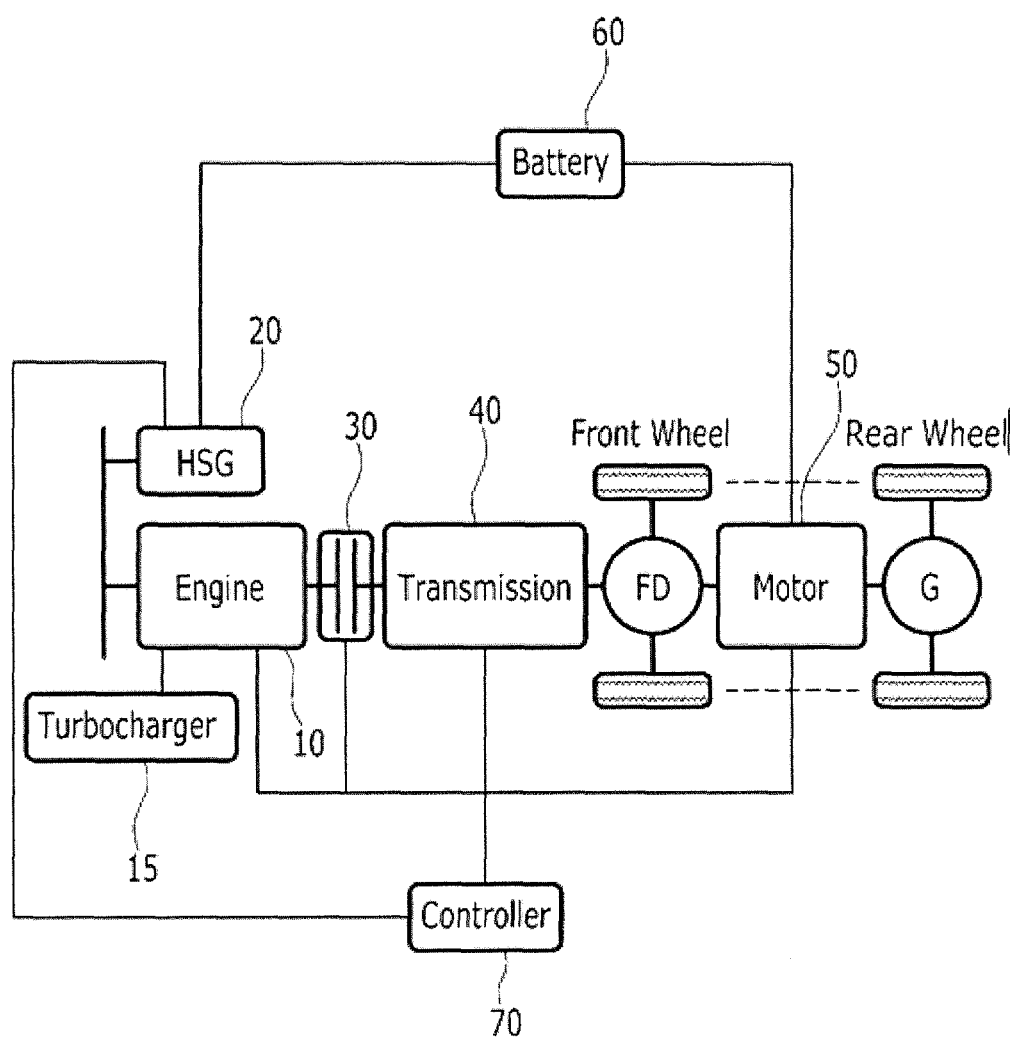
FIG. 1 is a schematic view illustrating a regenerative braking apparatus of a hybrid vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

Hereinafter, an exemplary embodiment of the present invention will be described with reference to the accompanying drawings so that those skilled in the Field of the Invention to which the present invention pertains may carry out the exemplary embodiment.

FIG. 1 is a schematic view illustrating a regenerative braking apparatus of a hybrid vehicle according to an exemplary embodiment of the present invention.

As shown in FIG. 1, a hybrid vehicle according to an exemplary embodiment of the present invention includes an engine 10 generating power by combustion of a fuel, a clutch 30, a transmission 40, a hybrid starter generator (HSG) 20 starting the engine 10 and generating power, a motor 50 assisting power of the engine 10, and a controller 70 controlling the engine 10, the HSG 20, and the motor 50.

The HSG 20 selectively operates as a starter and a generator. That is, the HSG 20 starts the engine 10 according to a control signal received from the controller 70, operates as a generator when the engine 10 is running, and generates electrical energy. The electrical energy generated by the HSG 20 is charged to a battery 60 provided in the hybrid vehicle.

The motor 50 assists power of the engine 10 in driving of the hybrid vehicle. For example, the motor 50 assists power of the engine 10 and improves driving performance during quick acceleration or uphill driving.

Also, the motor 50 operates as a generator in deceleration of the hybrid vehicle, and generates braking force by transforming kinetic energy to electrical energy. The electrical energy transformed by the motor 50 is charged to the battery 60.

The controller 70 totally controls the engine 10, the HSG 20, and the motor 50.

The controller 70 is at least one microprocessor which executes a predetermined program and/or hardware which includes the microprocessor. The predetermined program may be formed of a series of commands which perform a touch detecting method of a user terminal according to an exemplary embodiment of the present invention, which will be described below.

When the deceleration energy generated in braking exceeds the generating capacity of the motor 50, the controller 70 controls the HSG 20 to be operated as a generator and the hybrid vehicle is braked by regenerative braking.

When the deceleration energy generated in braking is lower than the generating capacity of the motor 50, the controller 70 controls the motor to be operated as a generator and the hybrid vehicle is braked by regenerative braking.

Specifically, required braking torque in braking can be calculated from the following Equation 1.

$$T=(M*a)*V/n \qquad \text{[Equation 1]}$$

Here, T is a required braking torque in deceleration, M is a mass of the hybrid vehicle, a is deceleration of the hybrid vehicle, V is a speed of the hybrid vehicle, and n is RPM of the engine.

Additional torque can be obtained by subtracting a maximum generating torque of the motor 50 from the result of Equation 1, and the additional torque is torque that exceeds generating capacity of the motor 50.

The controller 70 controls the motor 50 to operate as a generator, and the hybrid vehicle is braked by regenerative braking when T is lower than the generating torque of the motor 50. However, when T is higher than the generating torque of the motor 50, it controls such that the HSG 20 is operated as a generator and the hybrid vehicle is braked by regenerative braking.

Figure 3:
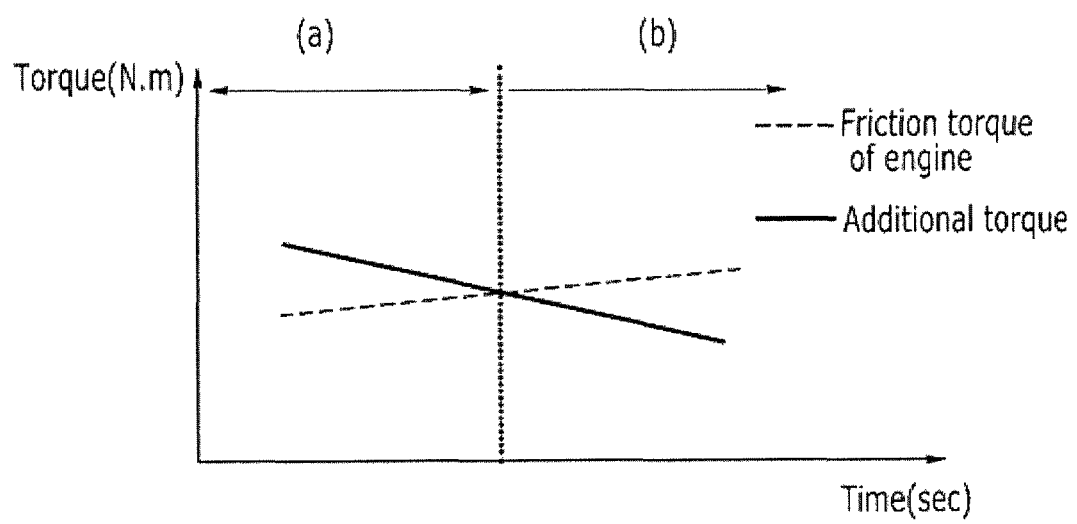
FIG. 3 is a graph illustrating a relationship of friction torque and additional torque according to time.

FIG. 3 is a graph illustrating a relationship of friction torque and an additional torque according to time.

As shown in FIG. 3, when the additional torque is higher than the friction torque of the engine 10, the controller 70 controls such that power of the engine 10 is connected and the HSG 20 is operated as a generator, and thereby the vehicle is braked by regenerative braking (refer to (a) section of FIG. 3). When the additional torque is lower than the friction torque of the engine 10, the controller 70 controls such that the engine 10 is cut and the motor 50 is operated as a generator, and thereby the vehicle is braked by regenerative braking (refer to (b) section of FIG. 3).

As described above, since the HSG 20 is operated as a generator and the hybrid vehicle is braked by regenerative braking when the deceleration energy of the hybrid vehicle exceeds generating capacity of the motor 50, fuel consumption is reduced.

Hereinafter, a regenerative braking method of a hybrid vehicle according to an exemplary embodiment of the present invention will be described in detail.

Figure 2:
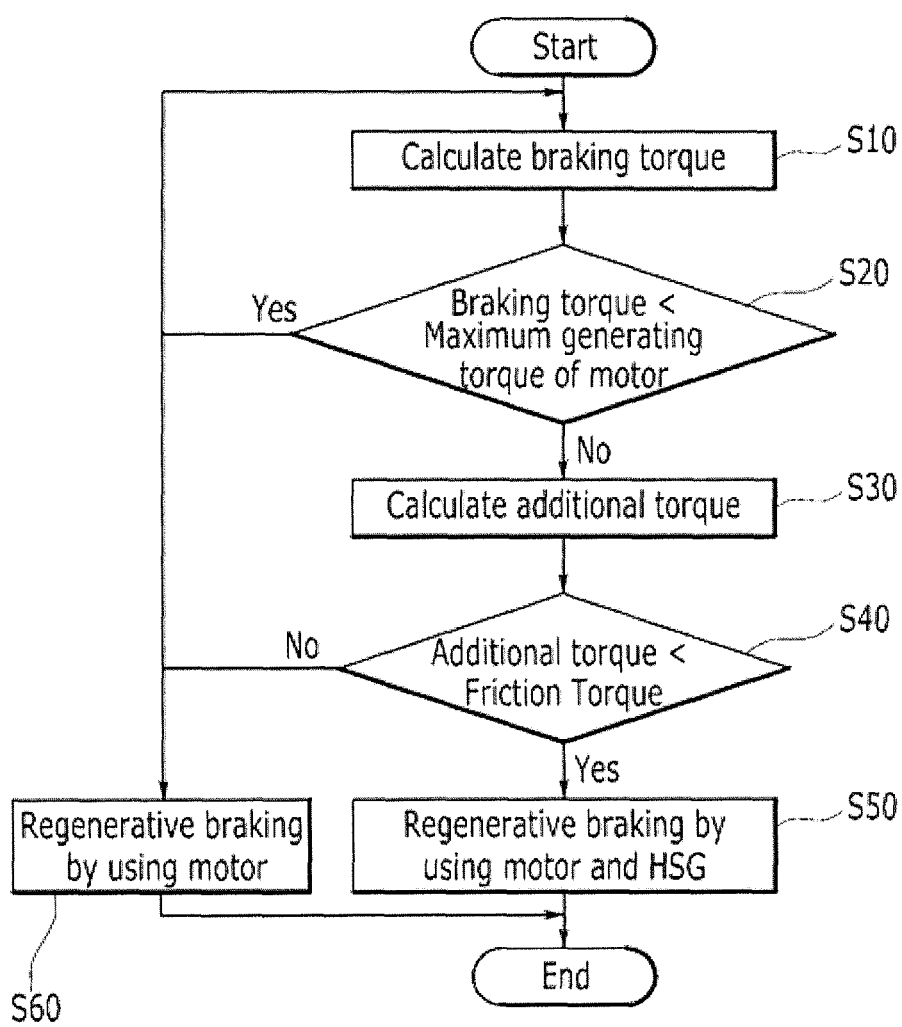
FIG. 2 is flowchart illustrating a regenerative braking method of a hybrid vehicle according to an exemplary embodiment of the present invention.

FIG. 2 is flowchart illustrating a regenerative braking method of a hybrid vehicle according to an exemplary embodiment of the present invention.

As shown in FIG. 2, the controller 70 calculates a braking torque required for braking when the hybrid vehicle is braked at step S10. The braking torque of the hybrid vehicle can be calculated by Equation 1.

The controller 70 compares the braking torque with a maximum generating torque of the motor 50 at step S20. If the maximum generating torque of the motor 50 is higher than the braking torque, the controller 70 controls such that the hybrid vehicle is braked by regenerative braking according to an operation of the motor 50 at step S60.

If the maximum generating torque of the motor 50 is lower than the braking torque, the controller 70 calculates an additional torque required for deceleration of the hybrid vehicle at step S30. The additional torque can be obtained by subtracting the maximum generating torque of the motor 50 from the braking torque calculated by Equation 1.

Further, the controller 70 compares the additional torque with the friction torque of the engine 10 at step S40. Here, the friction torque of the engine 10 can be determined by repeated experiments, can be defined by the controller 70 according to type of the vehicle, and can be saved to the controller 70.

If the additional torque is higher than the friction torque of the engine 10, the controller 70 controls such that the hybrid vehicle is braked by regenerative braking according to an operation of the motor 50 and the HSG 20 at step S50. However, if the additional torque is lower than the friction torque of the engine 10, the controller 70 controls such that the hybrid vehicle is braked by regenerative braking according to an operation of the motor 50 at step S60.

The controller 70 maximizes an opening of a vein of a turbocharger 15 supplying high pressure air to a combustion chamber of the engine 10 when the hybrid vehicle is braked by regenerative braking according to the HSG 20. When the opening of the vein of the turbocharger 15 is maximized, the friction torque of the engine 10 can be minimized.

The turbocharger 15 supplies high pressure air to the combustion chamber of the engine 10, and includes a turbine rotated by exhaust gas and a compressor compressing air by rotation force of the turbine.

The vein of the turbocharger 15 performs a function such that it controls an area of a flow path of exhaust gas flowing in the turbine of the turbocharger 15. Generally, in a low speed region of the engine, the controller 70 operates the turbine by reducing the opening of the vein so that the speed of the exhaust gas is increased. On the contrary, in a high speed region of the engine, the controller 70 prevents the turbine from excessive rotation by increasing the opening of the vein so that the speed of the exhaust gas is decreased.

As such, when the opening of the vein is maximized, the friction torque of the engine 10 can be minimized due to the decrease of speed of the exhaust gas supplied to the turbine.

Also, the controller 70 may change a shift speed to minimize the friction torque of the engine when the vehicle is braked by regenerative braking according to an operation of the HSG 20. The friction torque of the engine is inversely proportional to rotation speed of the engine. If a shift speed is increased under the same load condition, the rotation speed of the engine is decreased, and if the shift speed is decreased under the same load condition, the rotation speed of the engine is increased.

Therefore, the shift speed is changed so that the rotation speed of the engine is reduced and the friction torque of the engine is minimized.

As described above, according to an exemplary embodiment of the present invention, when deceleration energy in braking of a hybrid vehicle exceeds a generating capacity of a motor, the controller controls such that the hybrid vehicle is simultaneously braked by regenerative braking according to an operation of an HSG and a motor. Since the hybrid vehicle is braked by regenerative braking according to an operation of the HSG and the motor, fuel consumption of the hybrid vehicle is reduced.

According to an exemplary embodiment of the present invention, when deceleration energy generated in deceleration of the vehicle exceeds generating capacity of the motor, the excess deceleration energy can be regenerated by the HSG and can reduce fuel consumption.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A regenerative braking apparatus of a hybrid vehicle, comprising:
    an engine generating power by combustion of fuel;
    a Hybrid Starter Generator (HSG) starting the engine and generating electrical energy by operating as a generator when the engine is in an on state;
    a motor assisting the power of the engine, and generating electrical energy in braking; and
    a controller controlling such that the hybrid vehicle is braked by regenerative braking according to an operation of the HSG when deceleration energy in braking is higher than a generating capacity of the motor.

2. The regenerative braking apparatus of the hybrid vehicle of claim 1,
    wherein the controller compares an additional torque with a friction torque of the engine, the additional torque being determined by subtracting a maximum torque of the motor from a required torque in braking, and
    wherein the controller regeneratively brakes the motor and the HSG when the additional torque is higher than the friction torque, and regeneratively brakes the motor when the additional torque is lower than the friction torque.

3. The regenerative braking apparatus of the hybrid vehicle of claim 1,
    wherein the controller maximizes an opening of a vein of a turbocharger supplying high pressure air to a combustion chamber of the engine in regenerative braking of the HSG.

4. The regenerative braking apparatus of the hybrid vehicle of claim 1,
    wherein the controller changes shift speed to minimize a friction torque of the engine in the regenerative braking of the HSG.

5. A regenerative braking method of a hybrid vehicle, comprising:
    determining a friction torque of an engine and an additional torque, the additional torque being determined by subtracting a maximum torque of a motor from a required torque in braking;
    determining whether the additional torque is higher than the friction torque of the engine; and
    braking the motor and the HSG by regenerative braking when the additional torque is higher than the friction torque of the engine.

6. The regenerative braking method of the hybrid vehicle of claim 5,
    wherein the motor is braked by regenerative braking when the additional torque is lower than the friction torque of the engine.

7. The regenerative braking method of the hybrid vehicle of claim 6, further comprising:
    maximizing an opening of a vein of a turbocharger supplying high pressure air to a combustion chamber of the engine in regenerative braking of the engine.

8. The regenerative braking method of the hybrid vehicle of claim 6, further comprising:
    changing a shift-speed to minimize the friction torque of the engine in regenerative braking of the HSG.

* * * * *